W. F. KENDALL.
INDICATOR DRIVE CONNECTION.
APPLICATION FILED OCT. 30, 1913.
1,191,900.
Patented July 18, 1916.
2 SHEETS—SHEET 1.
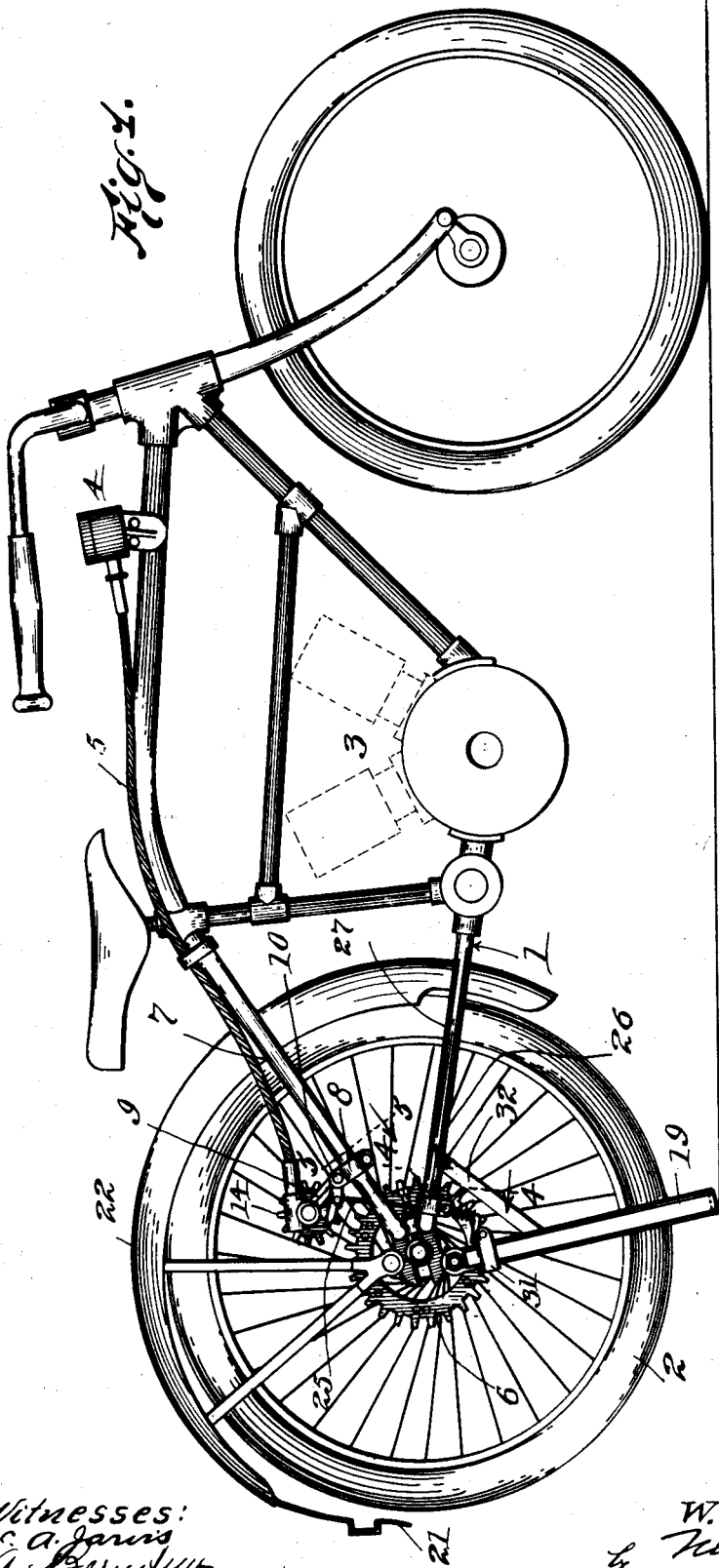
Witnesses:
Inventor
W. Floyd Kendall
by Newell Neal
attorneys

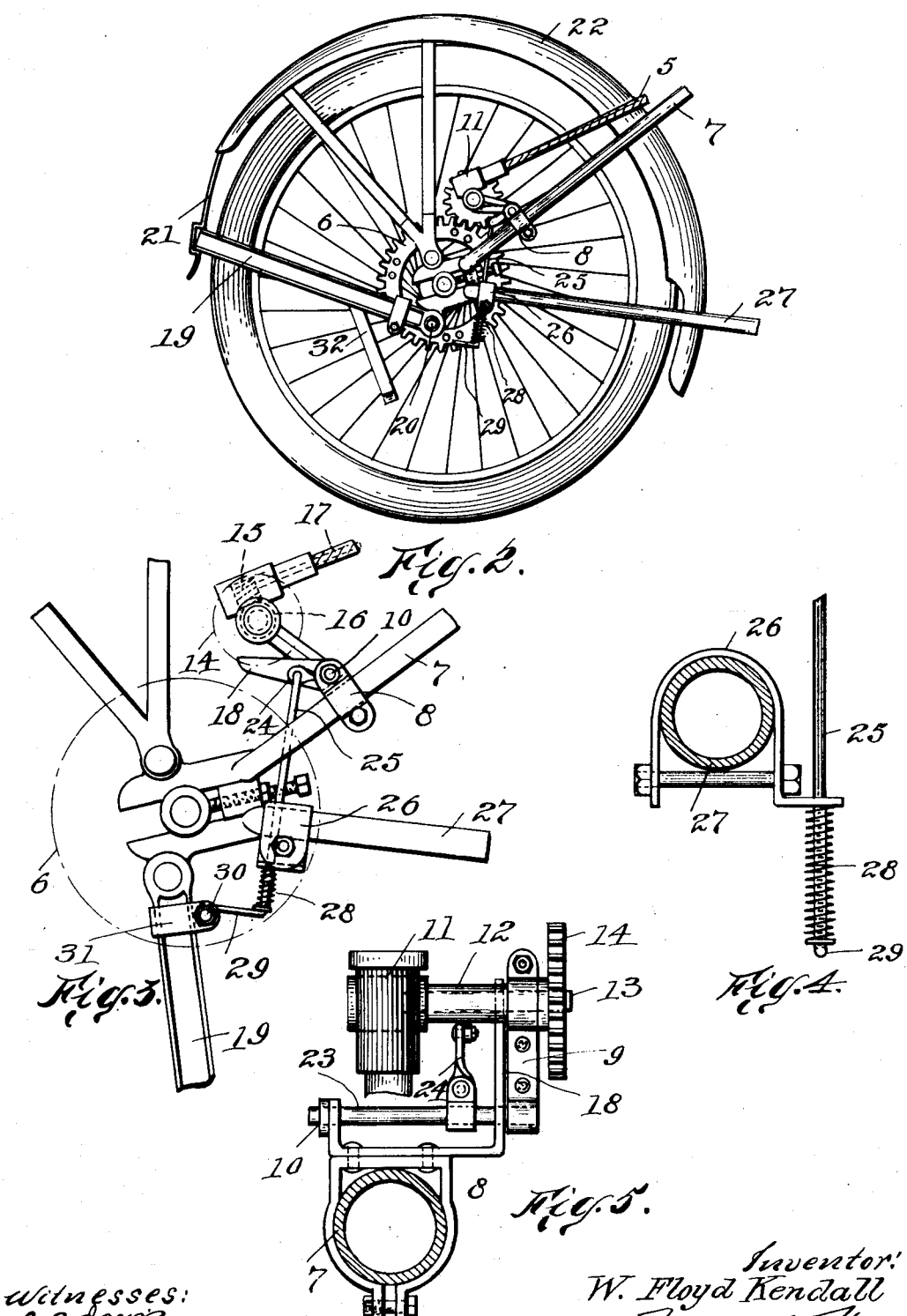

UNITED STATES PATENT OFFICE.

WILLIAM FLOYD KENDALL, OF TENAFLY, NEW JERSEY, ASSIGNOR TO SEARS-CROSS COMPANY, OF NEW YORK, N. Y., A CORPORATION OF NEW YORK.

INDICATOR DRIVE CONNECTION.

1,191,900.  Specification of Letters Patent.  Patented July 18, 1916.

Application filed October 30, 1913. Serial No. 798,211.

*To all whom it may concern:*

Be it known that I, WILLIAM FLOYD KENDALL, a citizen of the United States, residing at Tenafly, New Jersey, have invented certain new and useful Improvements in Indicator Drive Connections, of which the following is a clear, full, and exact description.

This invention relates to the driving connection for an indicating or recording instrument such as carried by a moving vehicle.

In the embodiment of the invention illustrated, I have shown the invention as applied to a motor cycle.

The recording or indicating instrument referred to usually comprises a speedometer for indicating the speed of the vehicle and also mechanism for indicating or recording the mileage.

A principal object of this invention is to provide means for preventing the actuation of the instrument when the driving mechanism of the vehicle is being tested or operated while the vehicle or motor-cycle is standing. In this way I prevent inaccuracies in the indications of the mileage.

One of the objects is to arrange the connection in such a way that when the supporting means is placed in position to raise the driving wheel off the ground, the connection to the instrument will be automatically disconnected.

Further objects of the invention will appear hereinafter.

The invention consists in the general combination of parts and simplicity of details hereinafter to be described, all of which contribute to produce an efficient indicator drive connection.

A preferred embodiment of my invention will be particularly described in the following specification, while the broad scope of my invention will be pointed out in the appended claims.

In the drawings, Figure 1 is a side elevation illustrating a motor-cycle to which the invention is applied and representing the motor-cycle as supported upon a stand with the drive mechanism to the indicating instrument disconnected; Fig. 2 is a side elevation showing the driving wheel representing the stand held up in the normal running position and showing the drive-connection to the instrument closed; Fig. 3 is a side elevation upon an enlarged scale showing the parts of this embodiment of the invention in the relation which they assume when the connection to the instrument is opened; Fig. 4 is a section taken on the line 4—4 of Fig. 1, and illustrating a form one of the details of the invention may take; and Fig. 5 is a section taken on the line 5—5 of Fig. 1, illustrating the preferred relation of the parts. In this view the case which incloses certain spiral gears is shown partly broken away and swung downwardly.

Referring more particularly to the parts, 1 represents the frame of a motor-cycle which may be of any suitable construction. Such motor-cycles are usually driven at a rear driving wheel 2 which is driven in any suitable manner from a motor indicated at 3. The rear wheel 2 is usually driven by a sprocket wheel and sprocket chain from the motor, but for the sake of clearness, these parts are omitted in the illustration. In applying the invention to such a motor-cycle, I mount the indicating or recording instrument 4 at a convenient point on the frame and I also provide a flexible shaft 5 which runs rearwardly along the frame. On the wheel 2 I rigidly secure a gear-wheel 6 and at some suitable point as on the rear fork 7, I provide a bracket 8 which is preferably in the form of a clamp which may be adjusted along the fork and secured at any point desired. This bracket is preferably provided with an arm 9 pivotally mounted at 10 and arranged so as to swing downwardly in a vertical plane toward the gear-wheel 6. This arm supports a gear case 11 which is provided with a horizontal tubular extension 12 passing through the arm so as to form a housing for a shaft 13 which carries a pinion 14 which is adapted to mesh with the gear-wheel 6. The gear case 11 preferably carries within it a spiral gear 15 which is adapted to be driven by a spiral gear 16 on the shaft 13. The spindle 17 of the flexible shaft 5 is connected with the spiral gear 15 from which arrangement it will be seen that when the pinion is in mesh with the gear 6, the instrument will be actuated. I prefer to form a stop to prevent the pinion from meshing too closely with the gear, and this stop is preferably formed by means of an arm or extension 18 which projects under the tubular member 12 from the bracket 8. Any suitable means may be provided for holding the pinion in a raised position such as indicated in Figs. 1 and 3 to prevent the driving of the instrument 4 when desired. I prefer however, to provide means for automatically opening the drive connection to the instrument when the stand or supporting means 19 is brought into position to support the rear wheel off the ground. This stand 19 may be in the usual form of a bifurcated leg which is pivoted at 20 on the cycle frame and normally held in elevated position by any suitable means such as the resilient tongue 21 projecting down from the rear of the mud-guard 22.

The arm 9 is preferably mounted on a rock-shaft 23 carrying the bracket, and this rock-shaft is adapted to be rocked so as to raise the arm 9, for which purpose I provide the rock-shaft with a rigid arm 24 which is connected with a stem 25 extending downwardly. The lower portion of this stem is preferably guided through a guide bracket 26 which is adjustably clamped on the lower tongue 27. A spring 28 may be arranged as indicated, which tends to pull the arm 24 downwardly so to hold the pinion in mesh with the gear-wheel. This stem may be provided with a lateral extension 29 which is adapted to be raised by projecting pin or stud 30 on the stand 19 when the stand comes down into its supporting position. This pin 30 forms an extension of the clamping screw on a bracket 31 which is adjustably clamped on the stand.

In order to insure that the motor-cycle will stand upright on the stand 19, I provide the stand with arms 32 which seat against the underside of the lower forks 27. In this way the weight of the motor-cycle holds the stand under it.

It is understood that the embodiment of the invention described herein is only one of the many forms or embodiments the invention may take, and I do not wish to be limited in the practice of the invention or in my claims to the particular embodiment set forth above.

The covering of the flexible shaft 5 being metallic as usual, has sufficient resiliency to hold the pin 14 in mesh with the gear 6, but in case the cover is not metallic, then this function is performed solely by the spring 28.

What I claim is:—

1. In an apparatus of the class described, in combination, a motor-cycle having a wheel adapted to rotate when the motor-cycle is driven, an indicating instrument carried by the motor-cycle, a drive-connection for actuating said instrument when said wheel rotates, supporting means movable into a supporting position to support said motor-cycle on the floor, and automatic means for opening said drive-connection when said supporting means is moved into its supporting position.

2. In an apparatus of the class described, in combination, a motor-cycle having a wheel adapted to rotate when the motor-cycle is driven, an indicating instrument carried by the motor-cycle, a drive-connection for actuating said instrument when said wheel rotates consisting of separable gear-wheels normally in mesh, supporting means movable into a supporting position to support said motor-cycle on the floor, and means actuated by said supporting means in moving into its supporting position to separate said gears to open the driving connection therebetween.

3. In an apparatus of the class described, in combination, a motor-cycle having a wheel adapted to rotate when the motor-cycle is driven, an indicating instrument carried by the motor-cycle, a driving gear wheel mounted to rotate when the motor-cycle is driven, a pinion normally meshing with said gear wheel for driving said indicating instrument, means for supporting said pinion in a position in which it is in mesh with said gear wheel and in a second position in which it is out of mesh with said gear wheel, resilient means tending to hold said pinion in mesh with said gear wheel, and supporting means movable into a supporting position to support said motor-cycle on the floor and having means for holding said pinion out of mesh with said gear wheel.

4. In an apparatus of the class described, in combination, a motor-cycle having a wheel adapted to rotate when the motor-cycle is driven, an indicating instrument carried by the motor-cycle, a driving gear-wheel adapted to rotate when the motor-cycle is driven, a pinion normally meshing with said gear-wheel for driving said indicating instrument, means for supporting said pinion in a position in which it is in mesh with said gear-wheel and in a second position in which it is out of mesh with said gear-wheel, resilient means tending to hold said pinion in mesh with said gear wheel, a stand movable into position for supporting said wheel off the floor and means carried by the stand for moving said pinion out of engagement with said gear-wheel.

Signed at New York, N. Y., this 27 day of October, 1913.

W. FLOYD KENDALL.

Witnesses:
F. D. AMMER,
BEATRICE MIRVIS.